(12) United States Patent
Seeger et al.

(10) Patent No.: US 8,171,000 B2
(45) Date of Patent: *May 1, 2012

(54) MOUNTED FILESYSTEM INTEGRITY CHECKING AND SALVAGE

(75) Inventors: James J. Seeger, Portland, OR (US); Thomas K. Clark, Gresham, OR (US); Andreas J. Moran, Tigard, OR (US); Jason C. Young, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 430 days.

This patent is subject to a terminal disclaimer.

(21) Appl. No.: 11/776,129

(22) Filed: Jul. 11, 2007

(65) Prior Publication Data
US 2008/0016075 A1   Jan. 17, 2008

Related U.S. Application Data

(63) Continuation of application No. 10/427,036, filed on Apr. 29, 2003, now Pat. No. 7,305,393.

(51) Int. Cl.
*G06F 17/30* (2006.01)

(52) U.S. Cl. .... 707/691; 707/704; 707/822; 707/E17.01

(58) Field of Classification Search .................. 707/8, 9, 707/E17.01, 704, 690, 691, 999.008, E17.001, 707/822
See application file for complete search history.

(56) References Cited

U.S. PATENT DOCUMENTS

| | | | |
|---|---|---|---|
| 5,043,876 A | | 8/1991 | Terry |
| 5,727,206 A * | | 3/1998 | Fish et al. ............... 707/202 |
| 5,875,444 A * | | 2/1999 | Hughes ................ 707/2 |
| 5,960,446 A | | 9/1999 | Schmuck et al. |
| 6,035,379 A | | 3/2000 | Raju et al. |
| 6,324,581 B1 | | 11/2001 | Xu et al. |
| 6,389,420 B1 | | 5/2002 | Vahalia et al. |
| 6,564,228 B1 | | 5/2003 | O'Connor |
| 6,665,675 B1 | | 12/2003 | Mitaru |
| 6,895,413 B2 * | | 5/2005 | Edwards ............ 707/201 |
| 6,912,554 B2 | | 6/2005 | Yuasa |
| 7,024,583 B2 * | | 4/2006 | Nguyen et al. .......... 714/5 |
| 7,162,497 B2 * | | 1/2007 | Wu .................. 707/200 |
| 7,546,319 B1 * | | 6/2009 | Srinivasan et al. .......... 1/1 |

OTHER PUBLICATIONS

Author: Frank Schmuck and Roger Haskin; Title: GPFS: A Shared-Disk File System for Large Computing Clusters; Date: Jan. 28-30, 2002; Proceedings of the Conference on File and Storage Technologies (FAST'02), Jan. 28-30, 2002, Monterey, CA, pp. 231-244. (USENIX, Berkeley CA.).*

ScanDisk Informational Document.

* cited by examiner

*Primary Examiner* — Tim T Vo
*Assistant Examiner* — Shiow-Jy Fan
(74) *Attorney, Agent, or Firm* — Lieberman & Brandsdorfer, LLC

(57) ABSTRACT

A method and system for conducting an integrity check of system and user metadata when the metadata is mounted. A filesystem reviewer is embedded within software of a server node. A mutual exclusion lock is obtained on the selected metadata. An automated verification of the locked metadata is conducted while the filesystem is mounted. In addition, an automated salvage of the locked metadata may be conducted while the filesystem is mounted. The verification and/or salvage of the locked metadata can be applied to system, user, and/or a portion of the user metadata.

15 Claims, 12 Drawing Sheets

MOUNTED FILESYSTEM INTEGRITY CHECKING AND SALVAGE

CROSS REFERENCE TO RELATED APPLICATION(S)

This application is a continuation of application Ser. No. 10/427,036, filed Apr. 29, 2003, now pending, which is hereby incorporated herein by reference.

BACKGROUND OF THE INVENTION

1. Technical Field

This invention relates to a method and system to conduct a consistency check on a distributed filesystem. More specifically, the invention relates to conducting the consistency check while filesystem metadata is mounted and available to an end user.

2. Description of the Prior Art

Systems and methods for reviewing the consistency of a filesystem are known in the art. FIG. 1 is a block diagram 10 of a node 12 running a single operating system instance. The node 12 has a native filesystem 14 specific to the hardware and operating system of the node 12, and a filesystem reviewer 16. In addition, the node is in communication with local storage media 18 that includes file and system metadata space. The filesystem reviewer 16 functions to conduct consistency checks on filesystem metadata. The filesystem reviewer 16 is not embedded within server software of the node, and as such is not able to obtain mutual exclusion locks on the filesystem metadata. Accordingly, the prior art filesystem reviewer for a node running a single operating system instance does not have the ability to operate while the metadata of the filesystem is mounted.

Similarly, FIG. 2 is a block diagram 20 of a client/server node 22 in communication with a storage area network 30. The client/server node has a native filesystem 24 specific to the hardware and operating system of the client/server node, and a filesystem reviewer 26. In addition, the client/server node 22 is in communication with the storage area network 30 that includes file data space 32 and filesystem metadata space 34. In opening the contents of an existing file object on the storage media in the storage area network 30, a client contacts the client/server node 22 to obtain metadata and locks. Metadata supplies the client with information about a file, such as its attributes and location on storage devices. Locks supply the client with privileges it needs to open a file and read or write data. The client/server node 22 performs a look-up of metadata information for the requested file within the metadata 34 of the storage area network 30. The client/server node 22 communicates granted lock information and file metadata to the requesting client, including the location of all data blocks making up the file. Once the client holds a distributed lock and knows the data block location(s), the client can access the data for the file directly from a shared storage device in communication with the storage area network 30. In addition, the client/server node 22 includes a native filesystem 24 and a filesystem reviewer 26. The filesystem reviewer 26 functions to conduct consistency checks on the filesystem metadata. However, the filesystem reviewer 26 of the client/server node 22 is not embedded within the server software, and as such is not able to obtain mutual exclusion locks on the filesystem metadata. Accordingly, the prior art filesystem reviewer for a client/server node in communication with a storage area network does not have the ability to operate while the metadata of the filesystem is mounted.

The prior art solutions for performing a consistency check on the filesystem metadata of a single node as shown in FIG. 1 as well as a distributed system with shared persistent data as shown in FIG. 2 conduct an initial check of the known filesystems at boot time. However, there are limitations associated with limiting a consistency check to boot time. For example, the filesystem metadata is dynamic and during operation of the filesystem the metadata is subject to change. Prior art consistency checks are not available for mounted filesystems. A consistency check on unmounted filesystem metadata requires that some resource in the filesystem be unavailable to a client and/or server node while the consistency check is conducted. Accordingly, there is a need for a tool that enables consistency checks and salvage of inconsistent data to be conducted on a mounted filesystem.

SUMMARY OF THE INVENTION

This invention comprises a system and method for conducting a consistency check on metadata of a distributed filesystem.

In one aspect of the invention, a method is provided for reviewing a data storage system. A file system is provided to communicate with metadata of local storage media of a node. Initially, a mutual exclusion lock is obtained on select metadata. Thereafter, an automated consistency check is performed on the locked and mounted metadata to determine validity of data within a locked data structure. Corruption of inconsistent data is reported to an operator.

In another aspect of the invention, a computer system is provided with memory and a processor in communication with storage media. A file system reviewer is provided to communicate with metadata of local storage media of a node. A mutual exclusion lock is obtained on select metadata, and a review manager conducts an automated consistency check on the locked and mounted metadata to determine validity of data within a locked data structure. Communication of corruption of inconsistent data is reported an operator.

In yet another aspect of the invention, an article is provided with a computer readable carrier including computer program instructions configured to review a data storage system. Instructions are provided to obtain a mutual exclusion lock on select metadata, and to perform an automated consistency check on the locked and mounted metadata to determine validity of data within a locked data structure. Furthermore, instructions are provided to report corruption of inconsistent data to an operator.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

In a server, a filesystem is provided, wherein the filesystem is in the form of a subtree rooted at a particular directory. The root of the tree is a uniform global namespace of the filesystem that describes the filesystem. A uniform global namespace provides the capability for all clients to have a consistent view of the name tree. Mutual exclusion locks and a temporary shadow copy of data structures are utilized to enable a consistency check of the mounted filesystem, i.e. when the filesystem is available and/or on-line.

Technical Details

Figure 1:
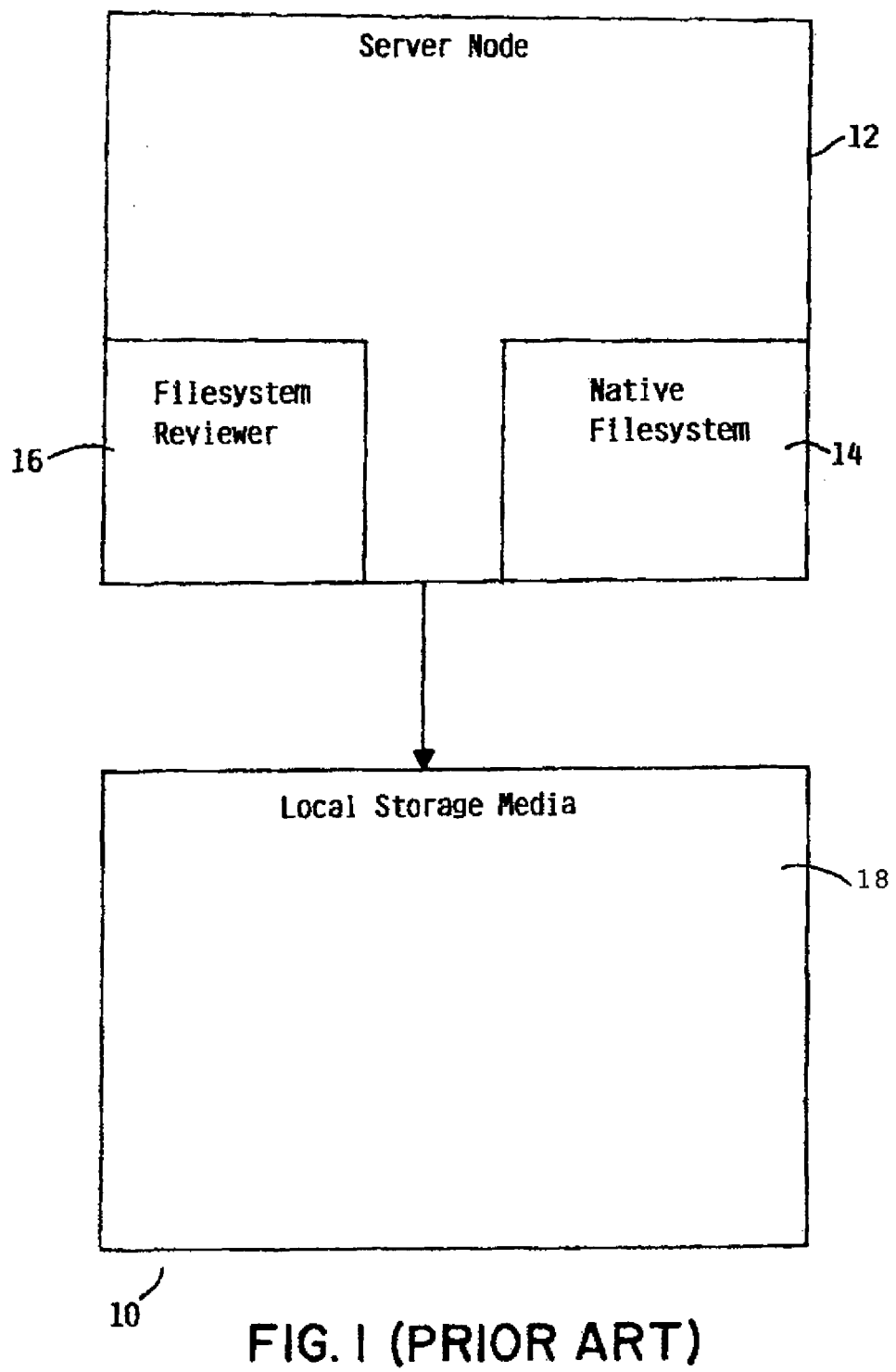
FIG. 1 is a prior art block diagram of a single node with a filesystem reviewer.
Figure 2:
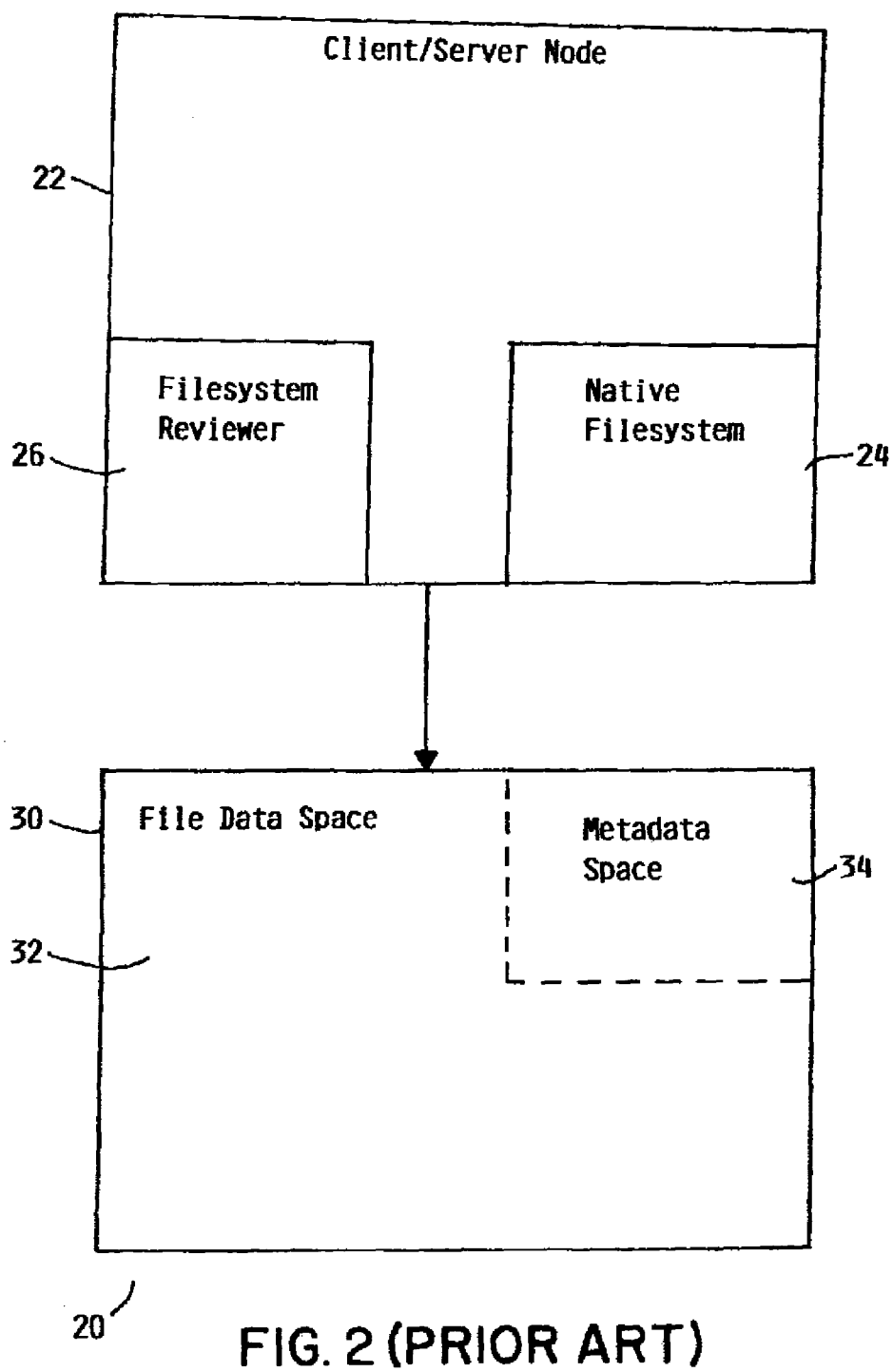
FIG. 2 is a prior art block diagram of a computer system with a server node in communication with a storage area network.
Figure 3:
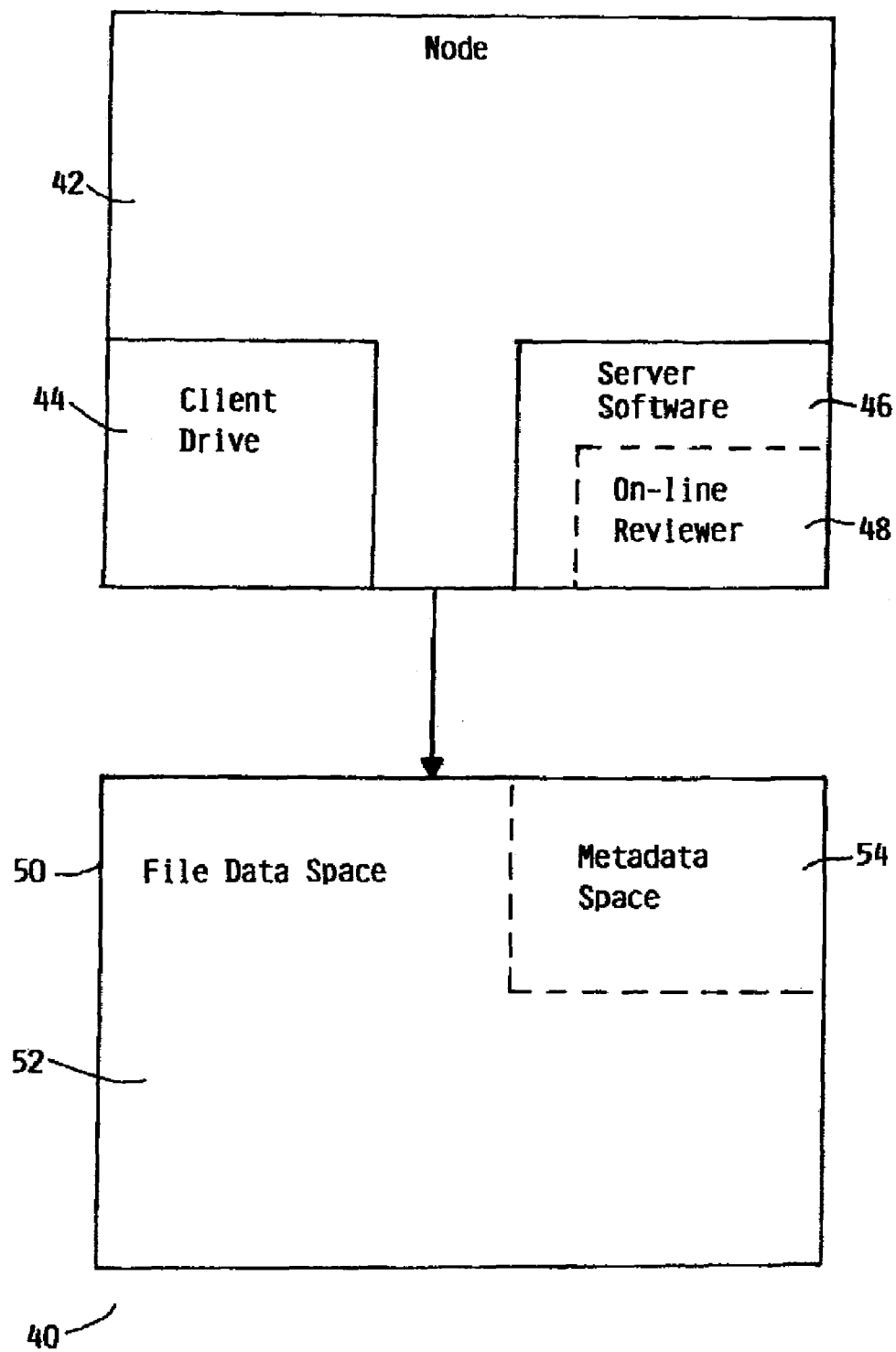
FIG. 3 is a block diagram of a computer system with a single node with an embedded filesystem reviewer
Figure 4:
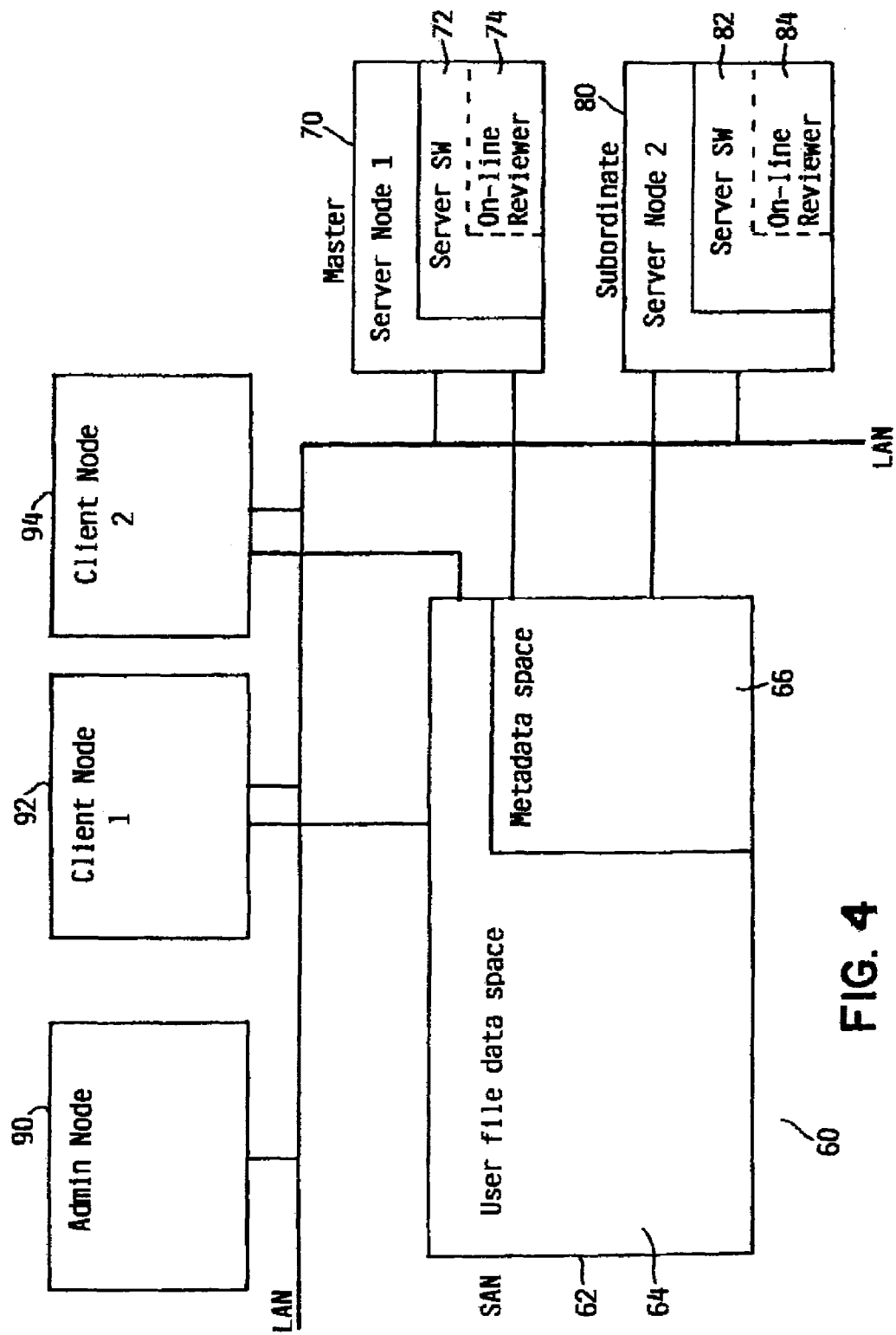
FIG. 4 is a block diagram of a computer system with a server node in communication with a storage area network.

FIG. 3 is a block diagram 40 of a node 42 running a single operating system instance with the filesystem reviewer according to the preferred embodiment. The node has a client driver 44 and server software 46. The server software 46 of the node 42 includes an online filesystem reviewer 48 embedded within the software of the server. The function of the filesystem reviewer 48 is to conduct consistency checks on the metadata. In addition, the node is in communication with local storage media 50. The local storage media 50 includes file data space 52 and metadata space 54. The filesystem reviewer performs I/O to the blocks of metadata space on the local storage media and performs consistency checks based on the data structure(s) being processed on the blocks. Similarly, FIG. 4 is a block diagram 60 of a distributed system with shared persistent storage and an embedded filesystem reviewer according to the preferred embodiment of the invention. The distributed system includes a storage area network 62 with multiple server nodes 70 and 80, an administrator node 90, and multiple client nodes 92 and 94. The storage area network 62 has file data space 64 and metadata space 66. The metadata space is reserved for the server nodes 70 and 80. Each of the client nodes 92 and 94 may access an object or multiple objects stored on the file data space 64 of the storage area network 62, but may not access the metadata space 66. In opening the contents of an existing file object on the storage media in the storage area network 62, a client contacts the server node to obtain metadata and locks. Metadata supplies the client with information about a file, such as its attributes and location on storage devices. Locks supply the client with privileges it needs to open a file and read or write data. The server node performs a look-up of metadata information for the requested file within the metadata space 66 of the storage area network 62. One of the server nodes 70 or 80 communicates granted lock information and file metadata to the requesting client node, including the location of all data blocks making up the file. Once the client node holds a distributed lock and knows the data block location(s), the client node can access the data for the file directly from a shared storage device attached to the storage area network. In addition, each of the nodes 70 and 80 include server software 72 and 82, respectively, with embedded filesystem reviewers 74 and 84. The filesystem reviewers may also request and obtain locks on metadata. Accordingly, the embedded filesystem reviewer may request and obtain a mutual exclusion lock on the requested metadata while the filesystem remains mounted.

Figure 5:
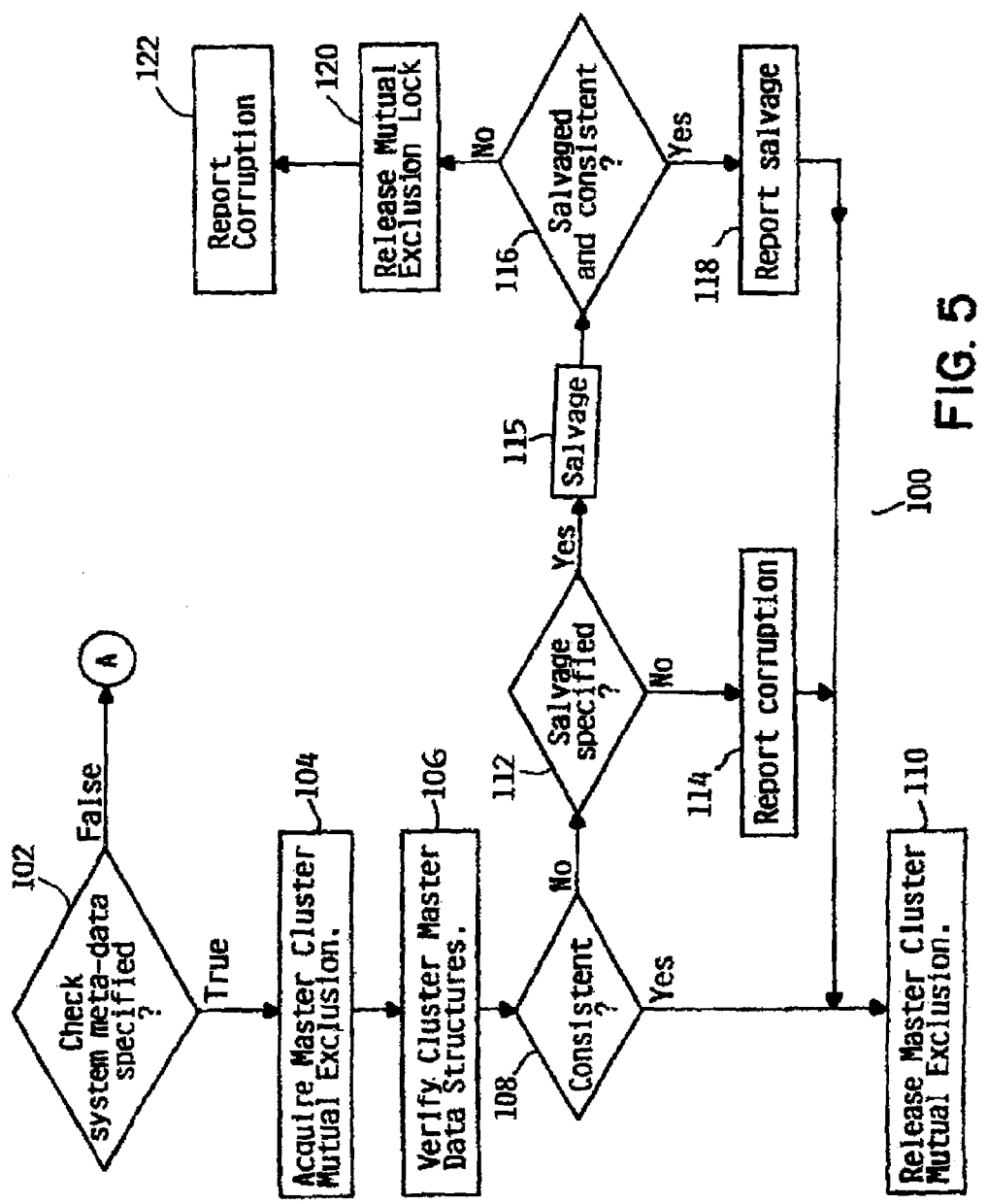
FIG. 5 is a flow chart illustrating the process of verifying consistency of master cluster data structures of system metadata according to the preferred embodiment of this invention, and is suggested for printing on the first page of the issued patent.

FIG. 5 is a flow chart 100 illustrating the process for conducting a consistency check on system metadata. The process is initialized by a query to determine if the operator authorizing the consistency check has specified the verification for system metadata 102. If the response to the query at step 102 is negative, the consistency check will proceed to a subsequent query to determine if the operator authorizing the consistency check has specified verification for user meta data. However, if the response to the query at step 102 is positive, a mutual exclusion lock is obtained on the master cluster data structures 104. Thereafter, a verification of the master cluster data structures is conducted 106. Following steps 104 and 106, a query 108 is conducted to determine if the data within the data structures on which the mutual exclusion lock has been acquired at step 104 is consistent within the rules set for the data, i.e. is the data valid. A positive response to the query at step 108 will complete the consistency check on specified data, and the mutual exclusion lock on the specified data structures is released 110. However, if it is determined that the data verified at step 106 is not consistent, then a subsequent query is conducted to determine if the operator authorized salvage of inconsistent data 112. If the operator did not request that the inconsistent data be salvaged, the corruption in the data is reported 114, and the mutual exclusion lock on the specified data structures is released 110. Alternatively, if the operator requested that the inconsistent data to be salvaged, a salvage of the inconsistent data is conducted 115. Following the salvage operation at step 115, a subsequent query is conducted to determine if the previously inconsistent data being checked has been salvaged and is now consistent 116. Salvage of the inconsistent data at step 115 will result in a production of a report of the salvage 118 followed by release of the mutual exclusion lock on the master cluster data structures 110. However, if the inconsistent data could not be salvaged, the mutual exclusion lock acquired at step 104 is released 120, and the corruption of the data is reported to the operator 122. Accordingly, the steps outlined above describe the process for conducting a consistency check on mounted master cluster data structures of system metadata.

Figure 6:
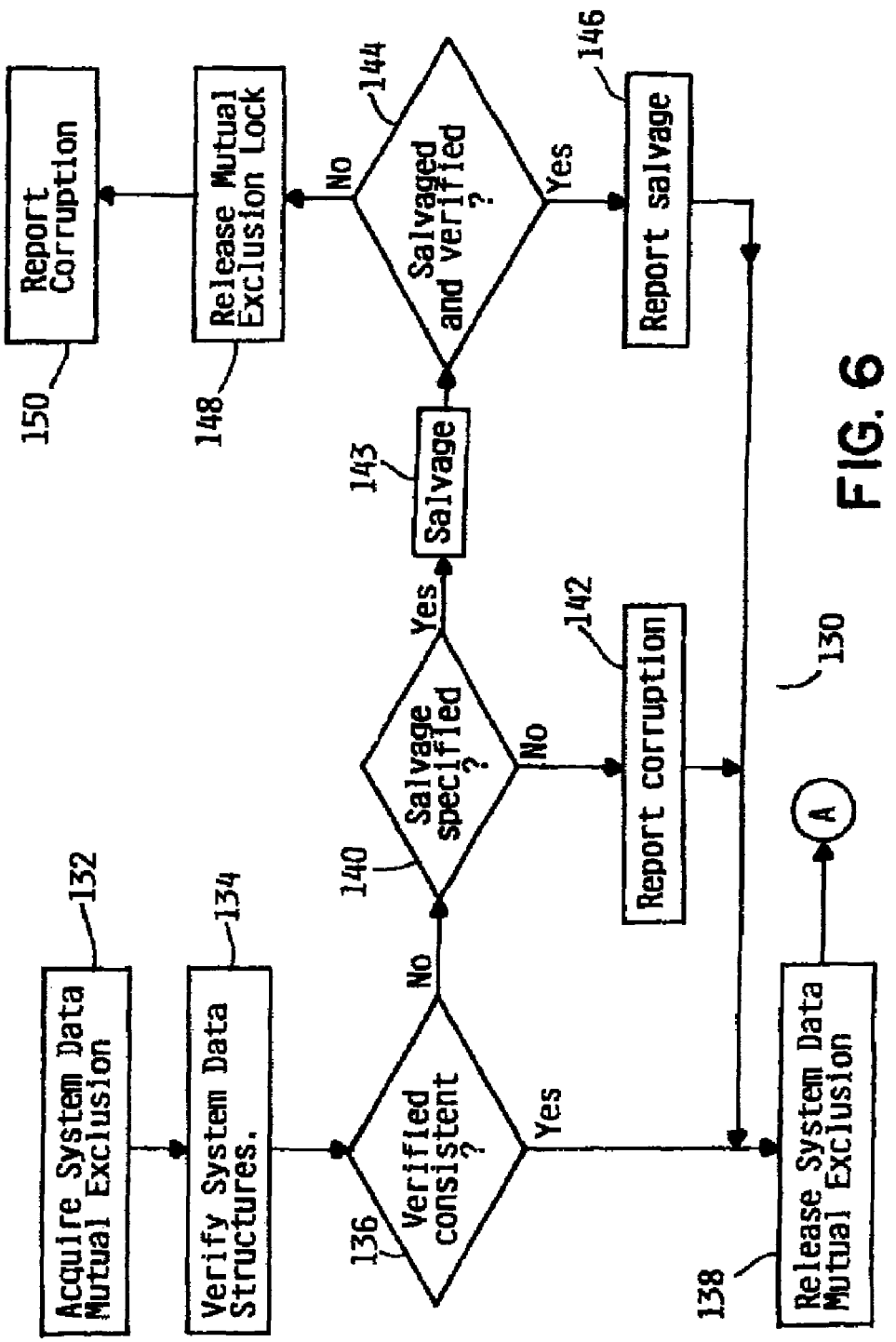
FIG. 6 is a flow chart illustrating the process of verifying consistency of system data structures of system metadata.

If at step 102 the operator indicated the consistency check to include system metadata, the system data structures are consistency checked following verification of the master cluster data structures. FIG. 6 is a flow chart 130 illustrating the process for conducting a consistency check on the system data structures. Following release of the mutual exclusion locks on the cluster master data structures at step 110, a mutual exclusion lock is obtained on the system data structures 132. Thereafter, verification of the system data structures is conducted 134. Following steps 132 and 134, a query is conducted to determine if the data in the data structures on which the mutual exclusion lock has been acquired at step 132 is consistent within the rules set for the data 136, i.e. is the data valid. A positive response to the query at step 136 will complete the consistency check on specified data, and the mutual exclusion lock on the system data structures is released 138. However, if it is determined that the consistency check of the system data structures is not consistent, then a subsequent query is conducted to determine if the operator authorized salvage of inconsistent data 140. If the operator did not request that the inconsistent data be salvaged, the corruption in the data is reported 142, and the mutual exclusion lock on the system data structures is released 138. Alternatively, if the operator requested that the inconsistent data be salvaged, a salvage of the inconsistent data is conducted 143. Following the salvage operation at step 143, a subsequent query is conducted to determine if the previously inconsistent data being verified has been salvaged and is now consistent 144. Salvage of the inconsistent data at step 143 will result in a production of a report of the salvage 146 followed by release of the mutual exclusion lock on the system data structures 138. However, if the inconsistent data could not be salvaged, the mutual exclusion lock is released 148, and the corruption of the data is reported to the operator 150. Accordingly, the steps outlined above describe the process for conducting a consistency check on mounted system data structures of system meta-data.

Figure 7:
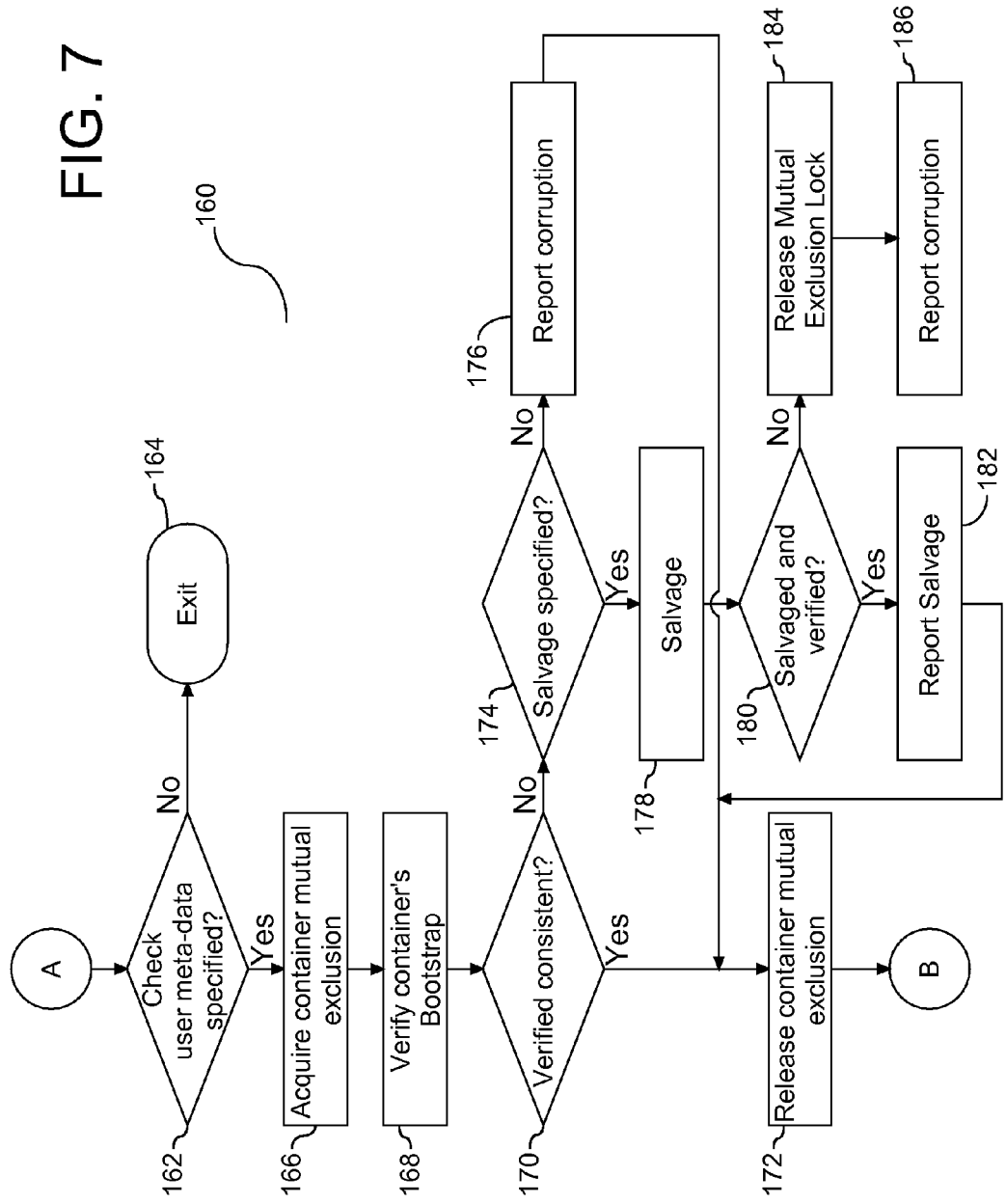
FIG. 7 is a flow chart illustrating the process of verifying consistency of a bootstrap of a logical portion of the global namespace.

At step 102 of FIG. 5, a query was conducted to determine if the operator specified the consistency check for system metadata. If the operator did not specify system metadata at step 102 or if the consistency check of the system metadata has concluded, a subsequent query is conducted to determine if the operator specified verification of user metadata 162. FIG. 7 is a flow chart 160 illustrating the process for conducting verification of user metadata. A negative response to the query at step 162 will result completion of the filesystem integrity check 164. However, a positive response to the query at step 162 will result in acquisition of a mutual exclusion lock for a logical portion of the global namespace specified by the operator 166. Thereafter, a verification of the bootstrap of the portion of the global namespace specified is conducted 168. Following steps 166 and 168, a query is conducted to determine if the data within the bootstrap of the logical portion of the global namespace is consistent within the rules set for the bootstrap 170, i.e. is the bootstrap valid. A positive response to the query at step 170 will complete the consistency check on logical portion of the global namespace, and the mutual exclusion lock on the logical portion of the global namespace is released 172. However, if it is determined that the bootstrap checked at step 170 is not consistent, then a subsequent query is conducted to determine if the operator authorized salvage of inconsistent data 174. If the operator did not request that the inconsistent data be salvaged, the corruption in the data is reported 176, and the mutual exclusion lock on the logical portion of the global namespace is released 172. Alternatively, if the operator requested that the inconsistent data from the bootstrap be salvaged, a salvage of the inconsistent data is conducted 178. Following the salvage operation at step 178, a subsequent query is conducted to determine if the previously inconsistent data being checked has been salvaged and is now consistent 180. Salvage of the inconsistent data at step 180 will result in a production of a report of the salvage 182 followed by release of the mutual exclusion lock on the logical portion of the global namespace 172. However, if the inconsistent data could not be salvaged, the mutual exclusion lock obtained at step 166 is released 184, and the corruption of the data is reported to the operator 186. Accordingly, the steps outlined above describes part of the process for conducting a consistency check on a mounted logical portion of the global namespace of the user metadata.

Figure 8:
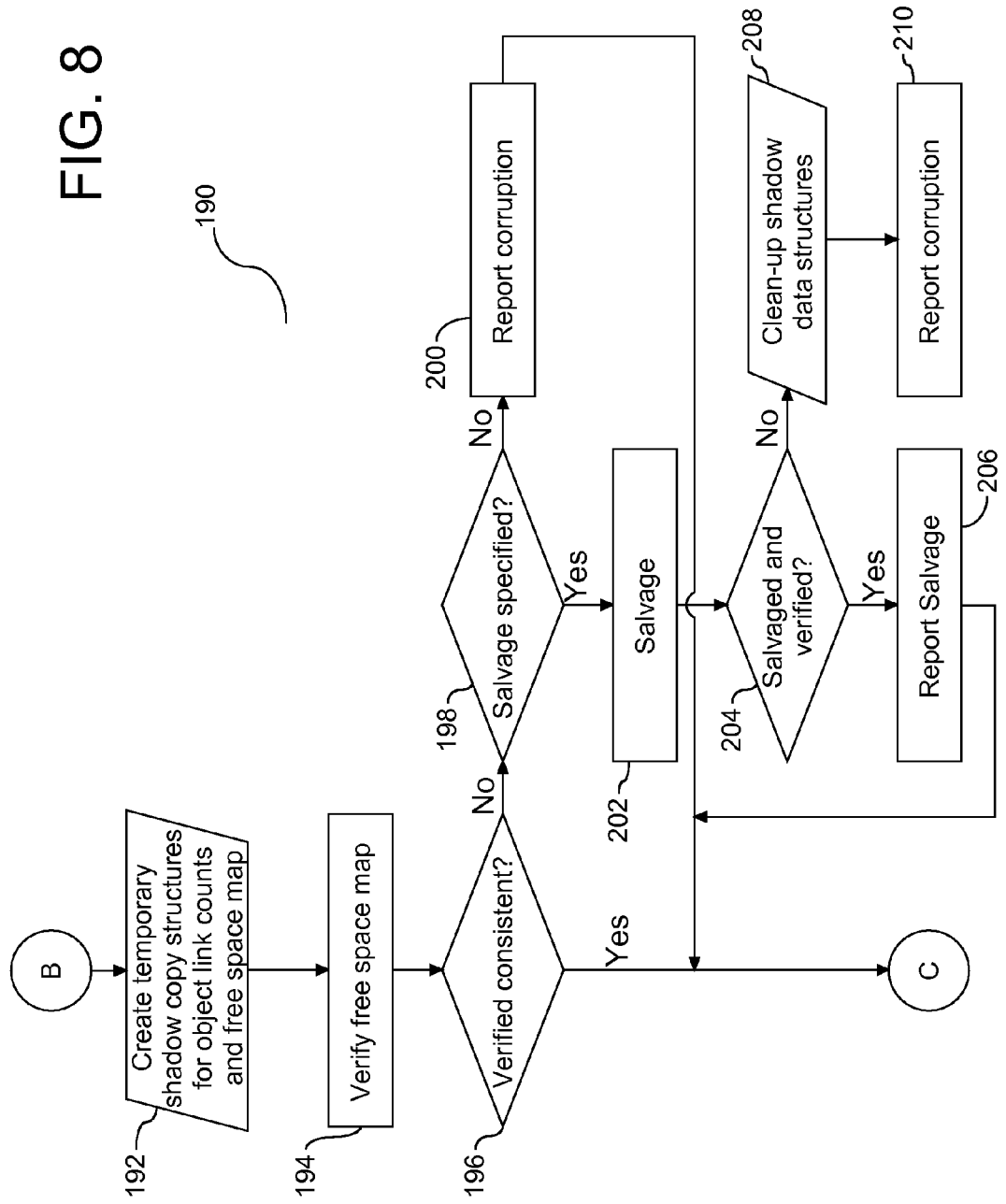
FIG. 8 is a flow chart illustrating the process of verifying consistency of a free space map of user metadata.

Following release of the mutual exclusion lock at step 172, the process of performing a consistency check on the user metadata continues. FIG. 8 is a flow chart 190 illustrating the process for verifying free space within the user meta data. A temporary shadow copy of specified data structures of the user metadata is created 192 and placed in persistent storage. Both the primary copy and the shadow copy of the specified data structures are maintained during the consistency check. Following creation of the shadow copy of the data structure, the free space map is verified 194. Each logical portion of the global namespace contains files with extent data structures that describe the objects used by the filesystem, i.e. describe the free space map. A query 196 is conducted to determine if the free space within the logical portion of the global namespace is consistent with the filesystem data. The consistency check at step 196 detects any orphaned blocks in the free space map. A positive response to the query at step 196 will complete the consistency check on the free space map. However, if it is determined that the free space of the filesystem data checked at step 196 is not consistent, then a subsequent query is conducted to determine if the operator authorized salvage of inconsistent data 198. If the operator did not request that the inconsistent data be salvaged, the corruption in the data is reported 200, and the consistency check on the free space map is complete. Alternatively, if the operator requested that the inconsistent data be salvaged, a salvage of the inconsistent data is conducted 202. Following the salvage operation at step 202, a subsequent query is conducted to determine if the previously inconsistent data being checked has been salvaged and is now consistent 204. Salvage of the inconsistent data at step 202 will result in a production of a report of the salvage 206 followed by completion of the consistency check on the free space map. However, if the inconsistent data could not be salvaged, the shadow data structures are removed from persistent storage 208, and corruption of the free space map is reported to the operator 210. Accordingly, the steps outlined above describes part of the process for conducting a consistency check on the free space map of a mounted logical portion of the global namespace of the user metadata.

Figure 9:
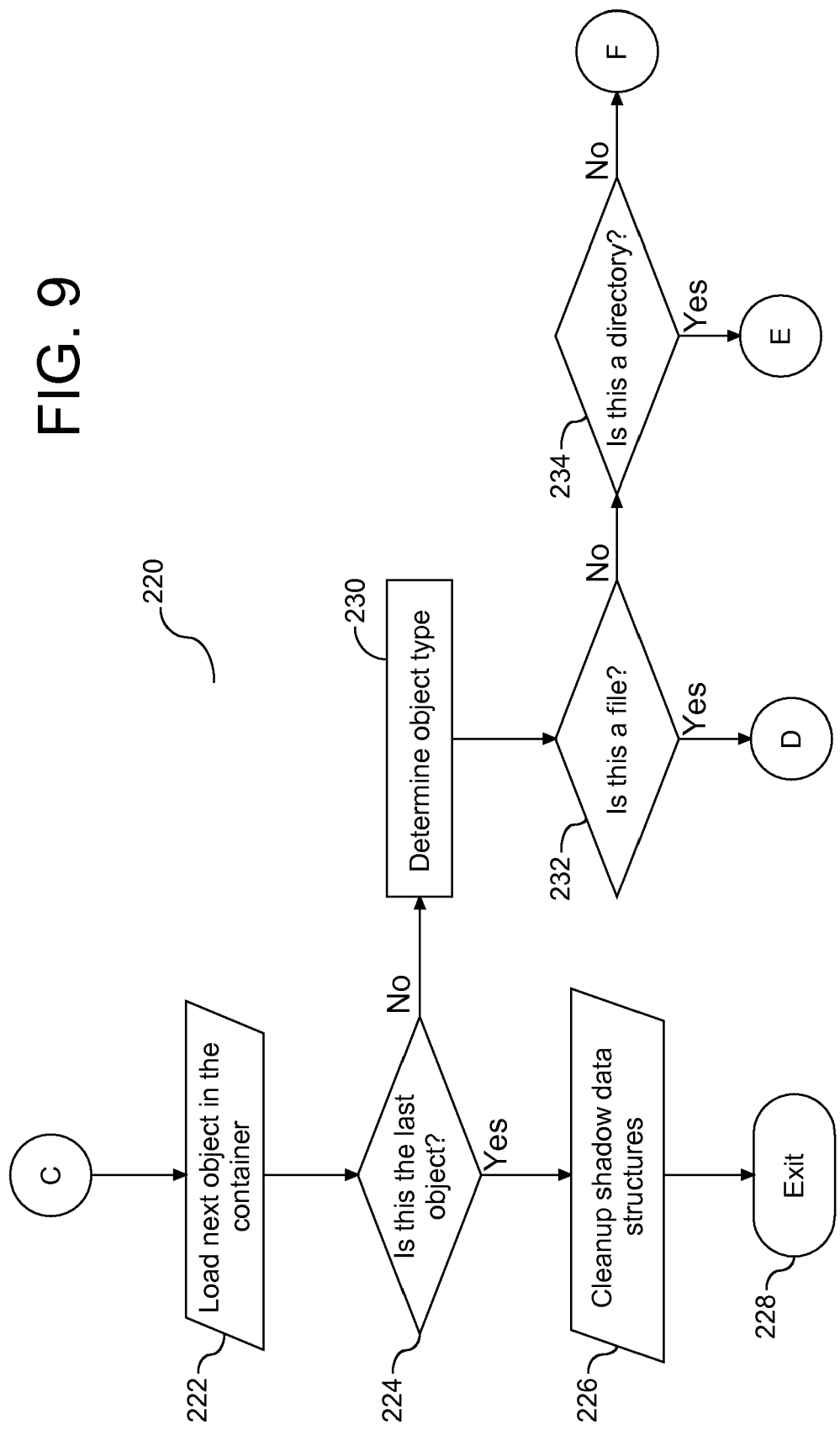
FIG. 9 is a flow chart illustrating the process of determining the type of the object in the user metadata to be verified.

Following completion of verification of the free space map, a subsequent object of the logical portion of the global namespace of the user metadata is loaded for verification 222. FIG. 9 is a flow chart 220 illustrating the process of verifying subsequent objects in the user metadata. An object may be a directory, symbolic link, or a file within the logical portion of the global namespace of the user metadata. Every object on the specified portion of the global namespace is verified. A query is conducted to determine if the final object in the logical portion of the global namespace of the user metadata 224 has been processed. A positive response to the query at step 224 will result in removal of the shadow data structures from persistent storage 226 and completion of the consistency check 228. However, a negative response to the query at step 224 will result in a determination of the object type 230. Different types of objects in the user metadata are verified through different processes. The object may be a file, a directory, or a symbolic link. Two subsequent queries are conducted to determine the object type. At step 232, a query to determine if the object in the logical portion of the global namespace is a file. If the object is not a file, a subsequent query is conducted to determine if the object in the logical portion of the global namespace is a directory 234. A negative response to the tests at step 232 and 234 is an indication that the object is a symbolic link. Accordingly, following verification of the free space map of the user metadata, the consistency check proceeds to conduct a verification for all of the objects in the logical portion of the global namespace of the user metadata.

Figure 10:
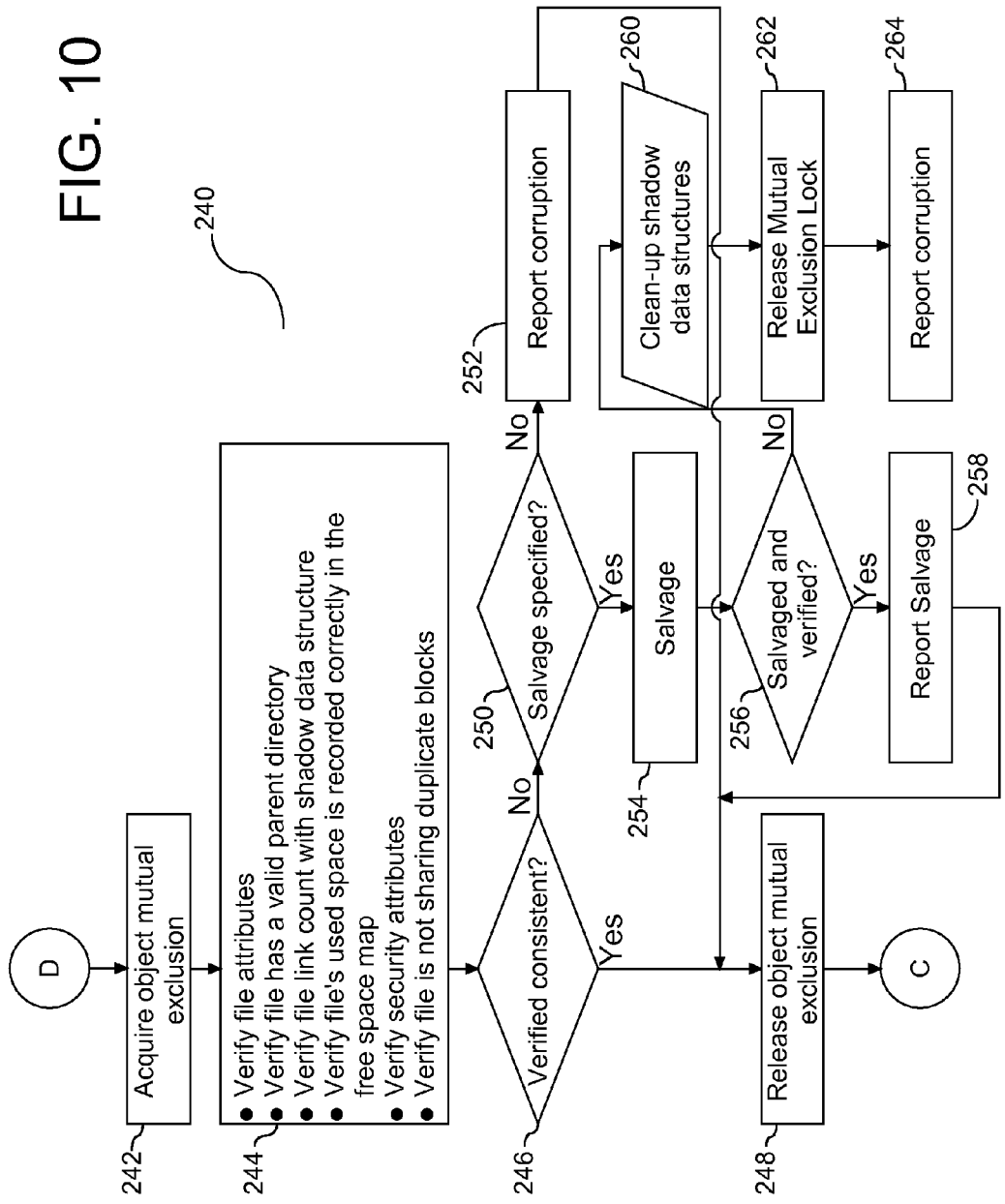
FIG. 10 is a flow chart illustrating the process of verifying consistency of an object file.

A positive response to the query at step 232, will result in verification of the data in the file specified as it will have been determined that the object is a file. FIG. 10 is a flow chart 240 illustrating the process of conducting a consistency check on a file. A mutual exclusion lock is obtained on the file 242. Thereafter, verification of the file attributes is conducted 244. File attributes include verification that a valid parent directory exists within the filesystem, that it's link count matches with the shadow data structure for the file, correct recordation of the file's extents in the free space map, the file is not sharing duplicate blocks with another file, and any security attributes of the file are within a range of acceptable values or possess a certain characteristic. A query 246 is conducted to determine if the file attributes verified at step 244 fall within a predefined range of value. A positive response to the query at step 246 will complete the consistency check on the file attributes and release the mutual exclusion lock on the specified file 248. However, if it is determined that the file attributes checked at step 246 is not consistent, then a subsequent query is conducted to determine if the operator authorized salvage of inconsistent file attributes 250. If the operator did not request that the inconsistent file attributes be salvaged, the corruption in the file attributes is reported 252, followed by release of the mutual exclusion lock on the specified file 248. Alternatively, if the operator requested that the inconsistent file attributes be salvaged, a salvage of the inconsistent data is conducted 254. Following the salvage operation at step 254, a subsequent query is conducted to determine if the previously inconsistent file attributes being checked has been salvaged and is now consistent 256. Salvage of the inconsistent file attributes at step 254 will result in a production of a report of the salvage 258 followed by release of the mutual exclusion lock on the specified file 248. If the inconsistent data could not be salvaged at step 256, the shadow data structures on the file are removed from persistent storage 260, followed by release of any mutual exclusion locks that may not have been previously released 262 and a report of corruption of the file to the operator 264. Accordingly, the steps outlined above describes part of the process for conducting a consistency check on a specified file of a filesystem object in a mounted logical portion of the global namespace of the user metadata.

Figure 11:
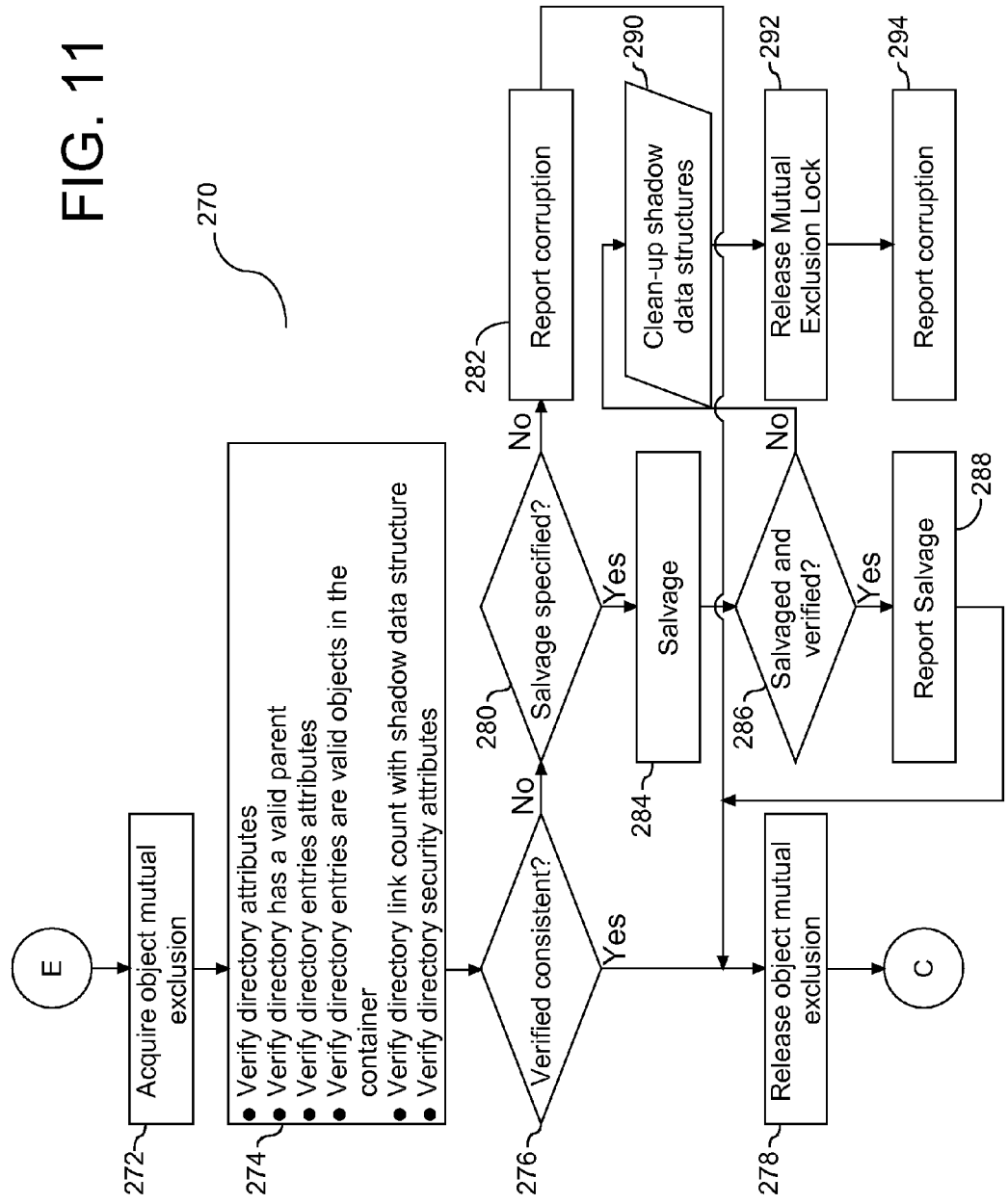
FIG. 11 is a flow chart illustrating the process of verifying consistency of an object directory.

A positive response to the query at step 234, will result in verification of the data in the directory specified as it will have been determined that the object is a directory. FIG. 11 is a flow chart 270 illustrating the process of conducting a consistency check on a filesystem directory. A mutual exclusion lock is obtained on the directory 272. Thereafter, verification of the directory attributes is conducted 274. Directory attributes include the following: a valid parent directory, directory entries, valid objects in the logical portion of the global namespace, it's link count matches with the shadow data structure for the directory, and security attributes. A query 276 is conducted to determine if the directory attributes verified at step 274 fall within a predefined range of values. A positive response to the query at step 276 will complete the consistency check on the directory and release the mutual exclusion lock on the specified directory 278. However, if it is determined that the directory checked at step 276 is not consistent with the predefined range of values, then a subsequent query is conducted to determine if the operator authorized salvage of inconsistent data 280. If the operator did not request that inconsistent data be salvaged, the corruption in the directory is reported 282, followed by release of the mutual exclusion lock on the specified directory 278. Alternatively, if the operator requested that the inconsistent directory be salvaged, a salvage of the inconsistent data is conducted 284. Following the salvage operation at step 284, a subsequent query is conducted to determine if the previously inconsistent directory being checked has been salvaged and is now consistent 286. Salvage of the inconsistent directory at step 284 will result in a production of a report of the salvage 288 followed by release of the mutual exclusion lock on the specified directory 278. If the inconsistent directory could not be salvaged, the shadow data structures are removed from persistent storage 290, followed by release of any mutual exclusion lock that may not have been previously released 292 and a report of corruption of the directory to the operator 294. Accordingly, the steps outlined above describes part of the process for conducting a consistency check on a specified directory of a filesystem object in a mounted logical portion of the global namespace of the user metadata.

Figure 12:
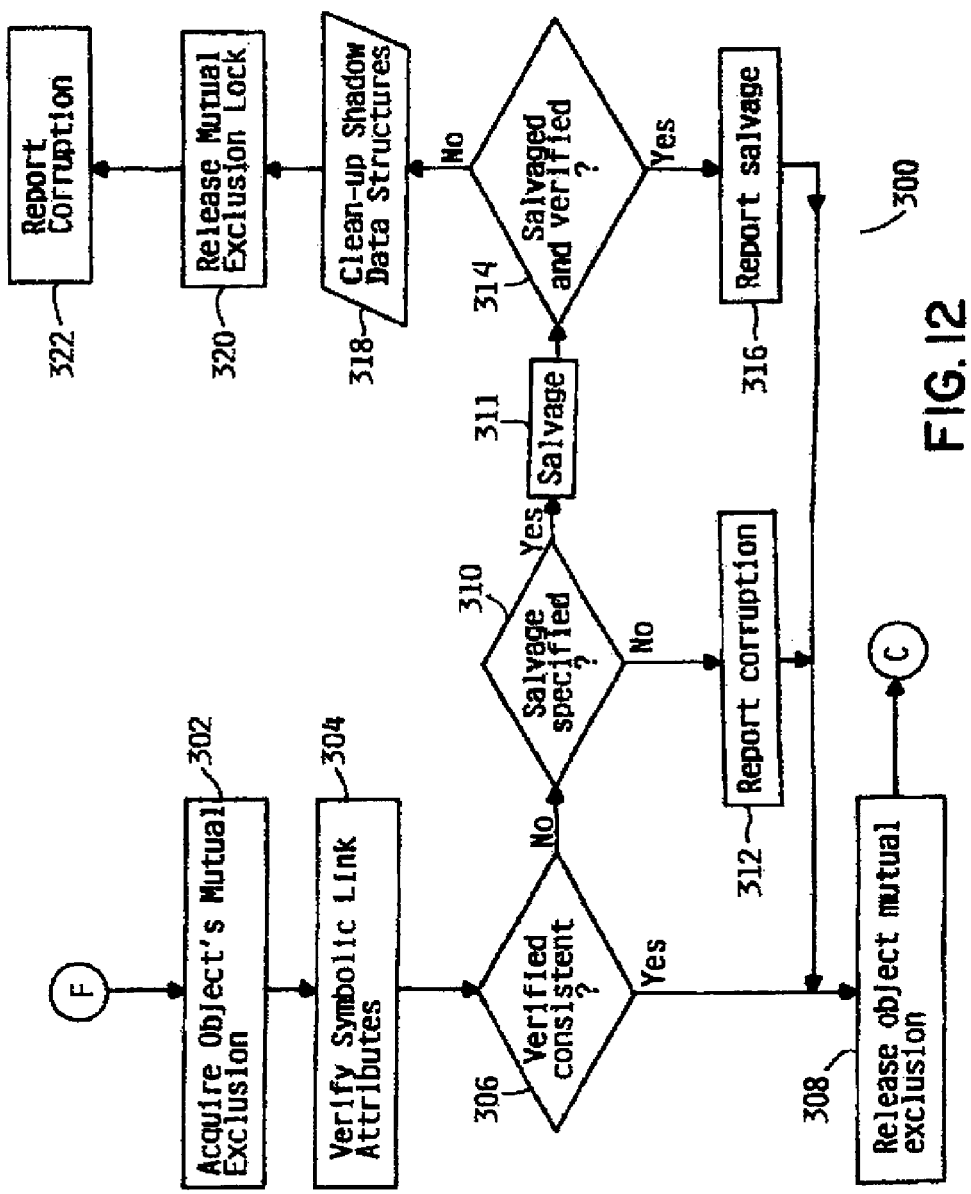
FIG. 12 is a flow chart illustrating the process of verifying consistency of an object symbolic link.

If at steps 232 and 234 of FIG. 9, it is determined that the object type is neither a file nor a directory, then the object is a symbolic link. FIG. 12 is a flow chart 300 illustrating the process of conducting a consistency check on a symbolic link. A mutual exclusion lock is obtained on the symbolic link of the object 302. Thereafter, a verification of the symbolic link attributes is conducted 304. Following steps 302 and 304, a query is conducted to determine if the symbolic link is consistent within the rules set for the link 306, i.e. is the symbolic link valid. A positive response to the query at step 306 will complete the consistency check on the symbolic link, and the mutual exclusion lock on the symbolic link is released 308. However, if it is determined that the data checked at step 306 is not consistent, then a subsequent query is conducted to determine if the operator authorized salvage of inconsistent data 310. If the operator did not request that inconsistent data be salvaged, the corruption in the data is reported 312, and the mutual exclusion lock on the symbolic link is released 308. Alternatively, if the operator requested that the inconsistent data be salvaged, a salvage of the inconsistent data is conducted 311. Following the salvage operation at step 311, a subsequent query is conducted to determine if the previously inconsistent data being checked has been salvaged and is now consistent 314. Salvage of the inconsistent data at step 311 will result in a production of a report of the salvage 316 followed by release of the mutual exclusion lock on the symbolic link 308. However, if the inconsistent data from the symbolic link could not be salvaged, the shadow data structures are removed from persistent storage 318, followed by release of any mutual exclusion lock that may not have been previously released 320 and the corruption of the data is reported to the operator 322. Accordingly, the steps outlined above describes part of the process for conducting a consistency check on a mounted portion of the global namespace of the user metadata.

Following release of the mutual exclusion lock from steps 248, 278, and 308, the process returns to step 222 of FIG. 9 to determine if there are additional objects in the logical portion of the global namespace to be verified for consistency. For each object specified in the user metadata, it must be determined whether the object is a file, a directory, or a symbolic link, and an appropriate verification and review of the object is conducted as outlined above. After the object has been identified and verified, the mutual exclusion lock on the specified object is released and the shadow copy of the data structure is removed from persistent storage.

Advantages Over the Prior Art

The process for checking the integrity of specified system or user metadata operates within the metadata server node.

This enables access to all of the internal data structures of the metadata, as well as access to mutual exclusion primitives. Verification of the metadata specified is conducted in conjunction with a mutual exclusion lock on an associated data structure, thereby protecting the data structure being verified. The locked metadata is verified and/or salvaged in an automated manner without requiring manual intervention, wherein the metadata may be system, user metadata, and/or a portion of the user metadata. Accordingly, the process for conducting an integrity check of the metadata includes obtaining use of mutual exclusion primitives and conducting the integrity check while the filesystem is mounted.

ALTERNATIVE EMBODIMENTS

It will be appreciated that, although specific embodiments of the invention have been described herein for purposes of illustration, various modifications may be made without departing from the spirit and scope of the invention. In particular, a fuzzy consistency check may be implemented to verify metadata while the filesystem is mounted. However, a mutual exclusion primitive is not invoked on the metadata being verified. The fuzzy consistency check is preferably implemented for metadata that requires an extended period of time, and therefore a mutual exclusion primitive on the associated metadata is not possible. The fuzzy consistency check determines whether the metadata falls within a defined boundary. Accordingly, the scope of protection of this invention is limited only by the following claims and their equivalents.

We claim:

1. A method for reviewing a data storage system, comprising:
   providing a file system supporting locks on metadata of local storage media of a node;
   a file system reviewer obtaining a mutual exclusion lock on select metadata, including user metadata, said file system reviewer embedded within a server in communication with the file system;
   the file system reviewer performing an automated consistency check on said locked metadata to determine validity of data within a locked data structure, wherein the file system is mounted during the consistency check and data referred to by the locked metadata is available, said consistency check including:
      for each data object identified as a file verifying: a file attribute, a valid parent directory, recording of used space in an associated free map space, an absence of a duplicate block, a link count with a shadow data structure, and a security attribute;
      for each data object identified as a directory verifying: a directory attribute, a valid parent directory, a directory entry attribute, validity of an object in a container, a link count with a shadow data structure, and a security attribute; and
      for each data object identified as a symbolic link verifying a symbolic link attribute; and
   reporting corruption of inconsistent locked metadata to an operator.

2. The method of claim 1, further comprising performing an automated salvage of inconsistent locked metadata, wherein said salvage includes attempting to make said inconsistent data valid.

3. The method of claim 1, further comprising creating a temporary shadow copy of specified data structures referred to by said metadata and said consistency check detecting orphaned objects in data provided by said shadow copy and blocks in a free space map from data provided by said shadow copy.

4. The method of claim 3, further comprising detecting blocks in said free space map from data provided by said shadow copy, wherein said blocks are selected from the group consisting of: duplicate blocks and orphaned blocks.

5. The method of claim 1, wherein said metadata is selected from the group consisting of: system metadata, a portion of said user metadata, and combinations thereof.

6. A computer system comprising:
   memory and a processor in communication with storage media;
   a file system reviewer adapted to obtain a mutual exclusion lock on select metadata, including user metadata, of local storage media of a node, said file system reviewer embedded within a server in communication with the file system;
   a review manager adapted to conduct an automated consistency check on said locked metadata to determine validity of data within a locked data structure, wherein the file system is mounted during the consistency check and data referred to by the locked metadata is available, said consistency check including:
      for each data object identified as a file verifying: a file attribute, a valid parent directory, recording of used space in an associated free map space, an absence of a duplicate block, a link count with a shadow data structure, and a security attribute;
      for each data object identified as a directory verifying: a directory attribute, a valid parent directory, a directory entry attribute, validity of an object in a container, a link count with a shadow data structure, and a security attribute; and
      for each data object identified as a symbolic link verifying a symbolic link attribute;
   a report to communicate corruption of inconsistent locked metadata to an operator.

7. The system of claim 6, further comprising a salvage manager to conduct an automated salvage of inconsistent locked metadata, wherein said salvage includes attempting to make said inconsistent data valid.

8. The system of claim 7, further comprising a shadow copy of specified data structures referred to by said metadata created to prepare for said consistency check, and said review manager to detecting orphaned objects in data provided by said shadow copy and blocks in a free space map from data provided by said shadow copy.

9. The system of claim 8, further comprising said review manager to detect blocks in said free space map from data provided by said shadow copy, wherein said blocks are selected from the group consisting of: duplicate blocks and orphaned blocks.

10. The system of claim 8, wherein said metadata is selected from the group consisting of: system metadata, a portion of said user metadata, and combinations thereof.

11. An article comprising:
   a computer readable non-transitory carrier including computer program instructions configured to review a data storage system, said instructions comprising:
      instructions for a file system reviewer to obtain a mutual exclusion lock on select metadata, including user metadata, said file system reviewer embedded within a server in communication with the file system;
      instructions for a file system reviewer to perform an automated consistency check on said locked metadata to determine validity of data within a locked data structure, wherein the file system is mounted during the consistency check and data referred to by the locked metadata is available, said consistency check including:
- for each data object identified as a file verifying: a file attribute, a valid parent directory, recording of used space in an associated free map space, an absence of a duplicate block, a link count with a shadow data structure, and a security attribute;
- for each data object identified as a directory verifying: a directory attribute, a valid parent directory, a directory entry attribute, validity of an object in a container, a link count with a shadow data structure, and a security attribute; and
- for each data object identified as a symbolic link verifying a symbolic link attribute;

instructions to report corruption of inconsistent locked metadata to an operator.

12. The article of claim 11, further comprising instructions to perform an automated salvage of inconsistent locked metadata, wherein said salvage includes attempting to make said inconsistent data valid.

13. The article of claim 11, further comprising instructions to create a temporary shadow copy of specified data structures referred to by said metadata and said consistency check detecting orphaned objects in data provided by said shadow copy and blocks in a free space map from data provided by said shadow copy.

14. The article of claim 13, further comprising instructions to detect blocks in said free space map from data provided by said shadow copy, wherein said blocks are selected from the group consisting of: duplicate blocks and orphaned blocks.

15. The article of claim 11, wherein said metadata is selected from the group consisting of: system metadata, a portion of said user metadata, and combinations thereof.

* * * * *